United States Patent [19]

Hock et al.

[11] Patent Number: 4,789,851

[45] Date of Patent: Dec. 6, 1988

[54] POWER DOOR LOCK INTERLOCK CIRCUIT

[75] Inventors: Darryl A. Hock, Harper Woods; David L. Kaleita, Hamtramck, both of Mich.

[73] Assignee: Jabil Circuit Company, Madison Heights, Mich.

[21] Appl. No.: 10,418

[22] Filed: Feb. 2, 1987

[51] Int. Cl.[4] .................................. B60Q 5/00
[52] U.S. Cl. ................................ 340/52 D; 180/286
[58] Field of Search ............. 340/52 D, 64; 180/286, 180/289; 307/10 AT, 10 R

[56] References Cited

U.S. PATENT DOCUMENTS

| | | | |
|---|---|---|---|
| 4,223,296 | 9/1980 | Kim et al. | 340/52 D |
| 4,427,967 | 1/1984 | Maiocco | 340/52 D |
| 4,428,024 | 1/1984 | Mochida et al. | 180/289 X |
| 4,572,320 | 2/1986 | Robbins, Jr. | 180/289 |
| 4,593,544 | 6/1986 | Claar et al. | 180/289 X |
| 4,709,777 | 12/1987 | Metz | 180/286 |

Primary Examiner—Joseph A. Orsino
Assistant Examiner—Brian R. Tumm
Attorney, Agent, or Firm—Harness, Dickey & Pierce

[57] ABSTRACT

The power door lock interlock circuit senses the presence of an ignition key in the ignition and also senses when a door is open. When these conditions are met, the power door lock is placed in an interlock condition whereby pressing the power door lock button causes the horn to sound instead of locking the doors. The circuit is thus useful in preventing the driver from accidentally leaving the ignition key in the ignition and accidentally locking all doors. All doors may be unlocked in the usual fashion and all doors may be locked in the usual fashion provided the interlock condition has not been met.

22 Claims, 4 Drawing Sheets

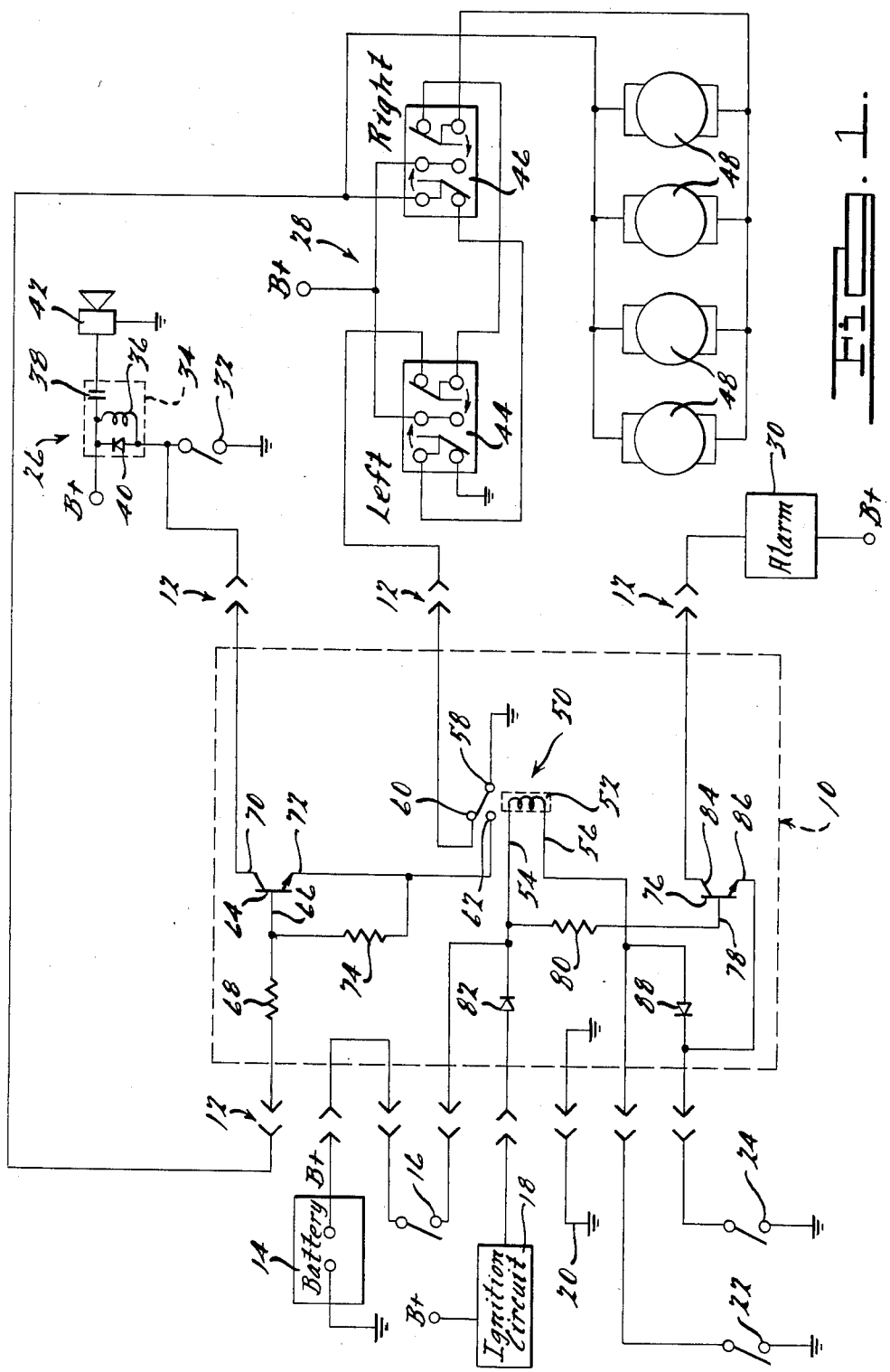

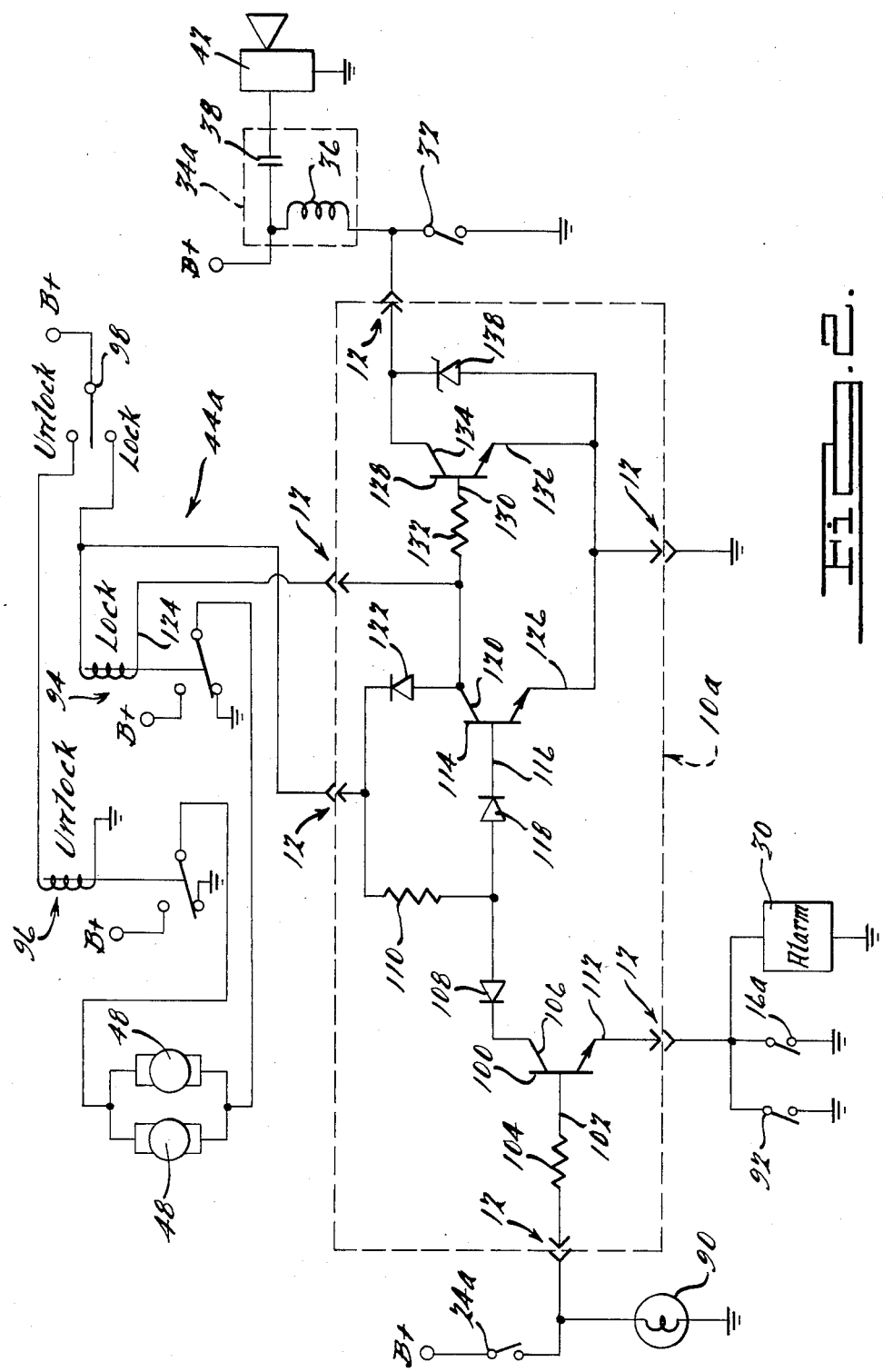

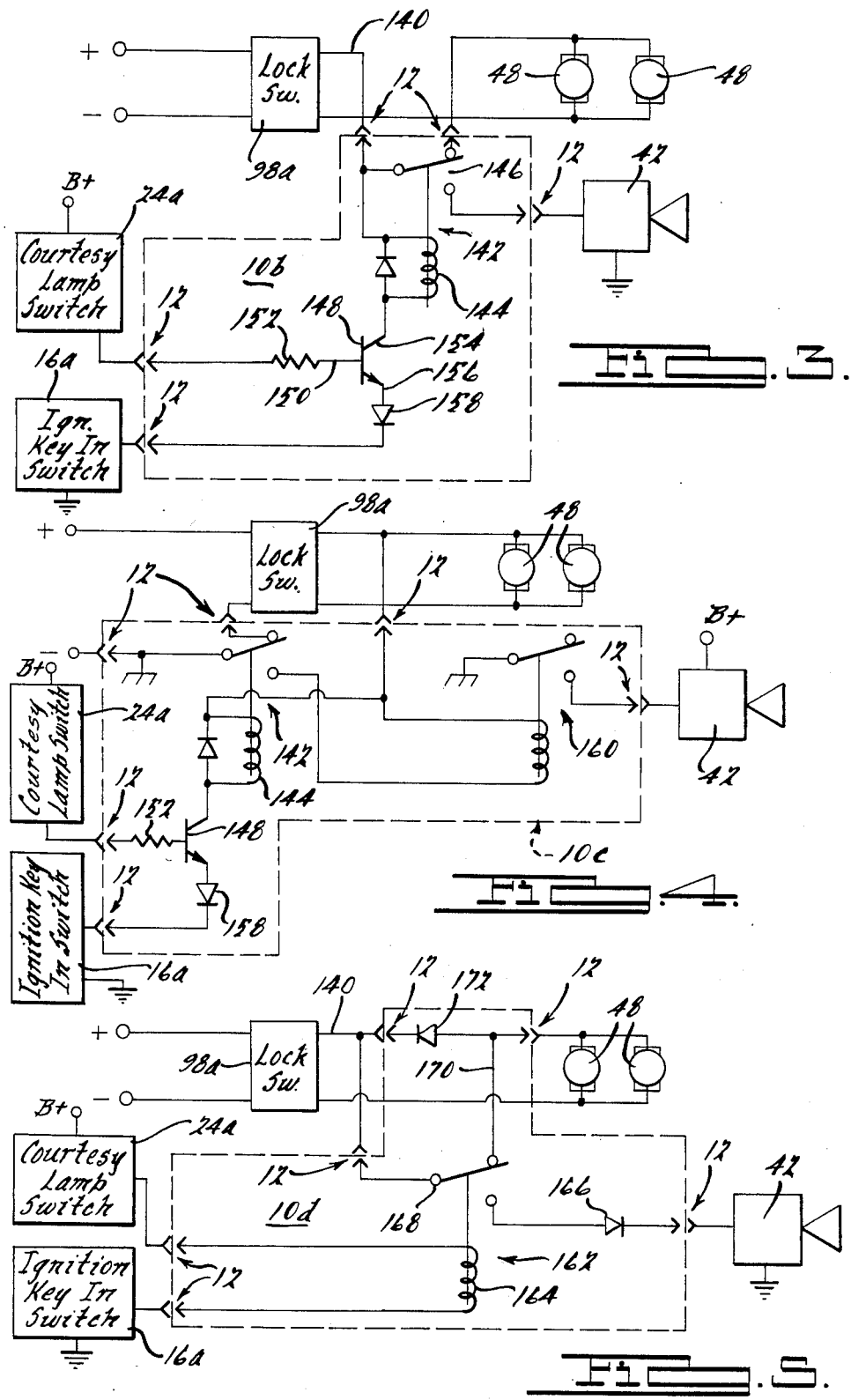

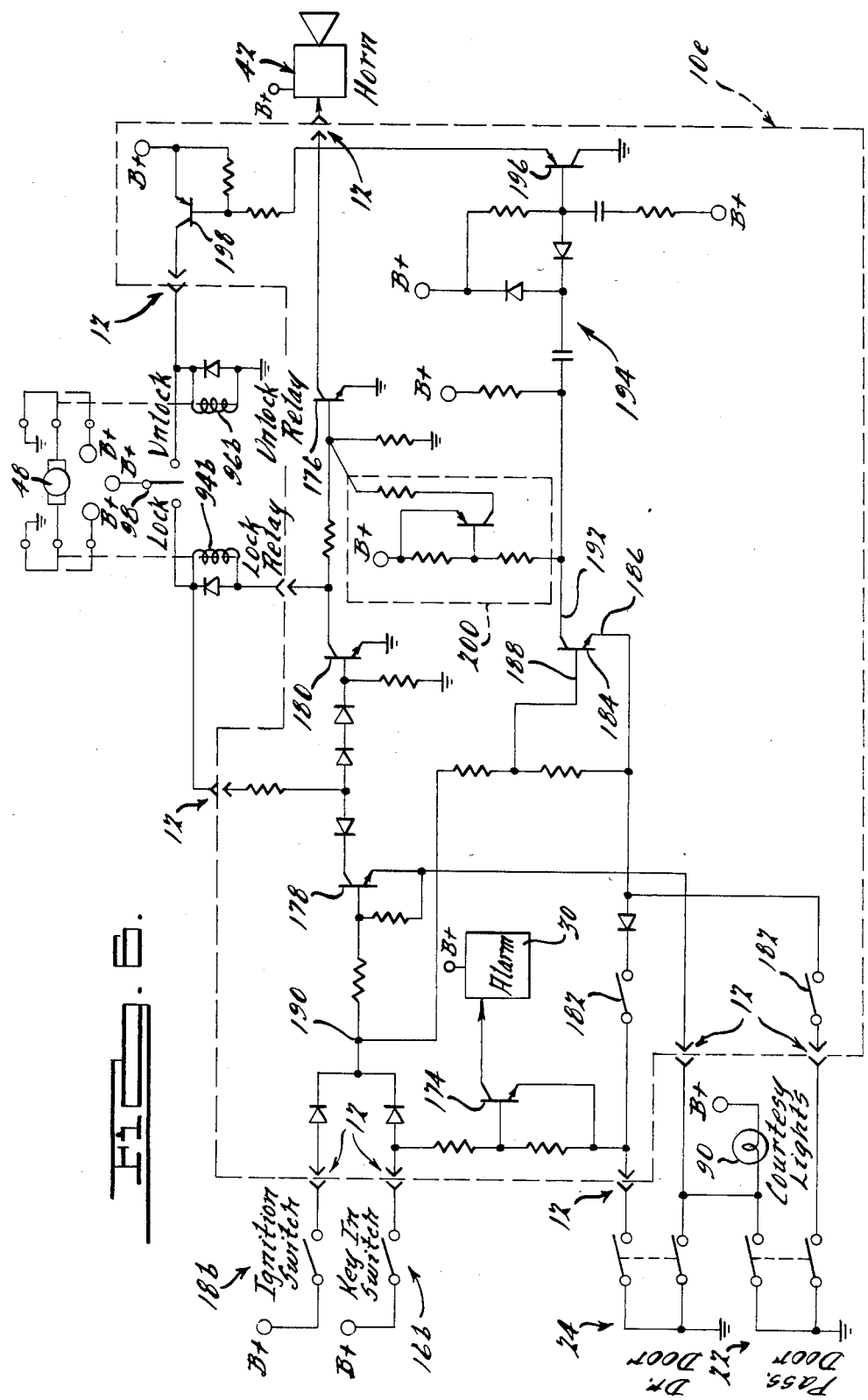

POWER DOOR LOCK INTERLOCK CIRCUIT

BACKGROUND AND SUMMARY OF THE INVENTION

The present invention relates generally to power door lock circuits for vehicles. More particularly, the invention relates to a circuit which responds to the presence of the ignition key in the ignition and also to an open vehicle door, by disabling the power door lock mechanism and causing the vehicle horn to sound when the door lock actuator is pressed.

Power door locks are a popular accessory on automotive vehicles. Although there is some variance in the manner in which power door lock mechanisms are implemented, most power door locks employ motors which lock the vehicle doors when energized by one polarity and which unlock the vehicle doors when energized by the opposite polarity. The locking motors or mechanisms are typically responsive to some form of actuator, such as a push button switch or rocker switch, which applies a voltage of the proper polarity across the lock motors to cause them to lock or unlock the associated doors.

Undoubtedly few have escaped the inconvenience and embarrassment of accidentally locking one's keys in the car. Addressing this problem, most automotive vehicle manufacturers provide some form of audible warning or alarm system, typically in the form of a buzzer, chime or synthesized voice. The conventional audible alarm senses when the ignition key is left in the ignition and the door (usually the driver's door) is opened. While serving as a useful reminder, some people lock their vehicle doors so automatically, that the audible warning alarm may not be effective, particularly in noisy surroundings in which the alarm may be unheard.

The above problem is even more acute in vehicles equipped with power door locks. Power door locks allow all vehicle doors to be locked at once. Should the driver accidentally leave the keys in the ignition, step out of the vehicle and depress the power door lock actuator, the chances of being locked out of the car are very great, since all doors are mechanically assured to be locked.

To overcome this problem, it has been proposed to provide a logic circuit for providing a warning independent of the audible warning alarm, although such alternative warning systems have proven to be unduly complicated and hence too expensive to be suitable for mass production in the comparatively competitive automobile industry.

SUMMARY OF THE INVENTION

The present invention provides a circuit which responds to the presence of the key in the ignition and to a vehicle door being open, by placing itself in an interlock condition in which actuation of the power door lock actuator causes the vehicle horn to sound and in which the lock mechanism is simultaneously inhibited from being actuated. The circuit is small, economical to manufacture and consumes little current when operating and zero quiescent current when the circuit is on standby. Thus, the circuit of the invention is well suited for use in mass produced automotive vehicles.

In accordance with the invention, a power door lock interlock circuit is provided for use in a vehicle having a power door lock, an actuator with mechanism responsive to the actuator, a horn, an ignition key sensing means for providing an indication when the ignition key is in the ignition and at least one vehicle door sensing means for providing an indication of the open and closed status of the door. One embodiment of the invention comprises a single pole double throw relay having a pair of energizing terminals coupled to a coil and having a common terminal and first and second selectively contactable terminals. When the coil is deenergized, the first contactable terminal is electrically coupled to the common terminal and when the coil is energized, the second contactable terminal is electrically coupled to the common terminal. The common terminal is coupleable to the vehicle ground through a connector or jack. The first contactable terminal is coupleable to the power door lock mechanism for supplying a grounding path for current flow in that mechanism. One of the energizing terminals of the relay is coupleable to the key sensing means for receiving electrical current therefrom. The other of the energizing terminals of the relay is coupleable to the door sensing means for providing a grounding path for current flow through the relay coil when the vehicle door is open. A first transistor having its base coupleable to the door lock actuator and having a first lead coupleable to the horn is included for providing a grounding path for sounding the horn. The first transistor has a second lead coupled to the second contactable terminal of the relay.

Another embodiment of the invention comprises a first transistor having its base coupleable to the door sensing means for turning the first transistor on when the vehicle door is open. The first transistor has a first lead coupleable to the lock actuator to receive current therefrom, and has a second lead coupleable to the key sensing means for providing a grounding path for current from the lock actuator, through the key sensing means, when the first transistor is on. A second transistor has a base coupleable to the lock actuator to receive current therefrom for turning the second transistor on when the lock actuator is actuated. The second transistor has a first lead coupleable to the lock mechanism and has a second lead coupleable to the vehicle ground for providing a grounding path for the lock mechanism, to permit the mechanism to function, when the second transistor is on. Conversely, when the second transistor is off, the lock mechanism is prevented from functioning. A third transistor has its base coupleable to the lock mechanism to receive current therefrom for turning the third transistor on when a current is received from the lock mechanism and when the second transistor is off. The third transistor has a first lead coupleable to the horn and has a second lead coupleable to the vehicle ground, for providing a grounding path for sounding the horn when the third transistor is on.

For a more complete understanding of the invention, its objects and advantages, reference may be had to the following specification and to the accompanying drawings.

BRIEF DESCRIPTION OF THE DRAWINGS

FIG. 1 is a schematic diagram of a first embodiment of the invention;

FIG. 2 is a schematic diagram of a second embodiment of the invention;

FIG. 3 is a schematic diagram of a third embodiment of the invention;

FIG. 4 is a schematic diagram of yet another embodiment of the invention;

FIG. 5 is a schematic diagram of yet another embodiment of the invention; and

FIG. 6 is a schematic diagram of still another embodiment of the invention.

DESCRIPTION OF THE PREFERRED EMBODIMENTS

Referring first to FIG. 1, a first embodiment of the invention will be described. This embodiment is well suited for vehicles of the type which switch devices to ground in order to actuate them. In FIG. 1, the circuit of the invention is denoted generally at 10. Circuit 10 is coupleable through a jack or connector to the associated vehicle components. In FIG. 1, the jack is depicted by a plurality of individual connection points 12. Circuit 10 is thus coupled to the vehicle battery 14 and to the ignition key in switch 16, which senses the ignition key for providing an indication when the ignition key is in the ignition. Circuit 10 is also coupleable to the ignition circuit 18 and to the vehicle ground 20. Also connected to circuit 10 are the passenger door pillar switch 22 and the driver's door pillar switch 24, which comprise the door sensing means for providing an indication of the open and closed status of the doors. For the type of vehicle illustrated, switches 22 and 24 are closed or switched to ground when the associated vehicle door is opened. Circuit 10 is also coupleable to the vehicle horn assembly 26, to the door lock actuator and mechanism 28 and to the audible warning alarm device 30. In the vehicle illustrated in FIG. 1, the horn assembly comprises a horn switch 32, which is closed to ground when the horn is depressed. A horn relay 34, comprising a relay coil 36, a capacitor 38 and a flyback diode 40, is coupled to the horn 42. The door lock actuator and mechanism 28 comprises a left door lock actuator 44 and a right door lock actuator 46. Both actuators are coupled as illustrated to a plurality of locking mechanisms or motors 48 which perform the mechanical locking and unlocking operations. The locking mechanisms lock the associated doors when energized with one polarity and unlock the associated doors when energized with the opposite polarity. Selection of the appropriate polarity for energizing these mechanisms is provided by the actuators 44, which are coupled to the battery and vehicle ground as illustrated. Audible warning alarm 30 may be a buzzer, chime or electrically synthesized voice module.

Circuit 10 comprises a single pole double throw relay 50 having coil 52 with a pair of coil energizing terminals 54 and 56. Relay 50 has a common terminal 58 coupled to vehicle ground and first and second contactable terminals 60 and 62. When coil 52 is not energized, the contactable terminal 60 is coupled to common terminal 58, as illustrated in FIG. 1. When coil 52 is energized, the relay switches to the opposite position in which contactable terminal 62 is coupled to common terminal 58.

A first transistor 64 has its base 66 coupled through resistor 68 to the right door lock actuator 46, as illustrated. It is also coupled to the left door lock switch by virtue of the interconnection of those two switches, as illustrated. A first terminal 70, the collector, of transistor 64 is coupleable to the horn assembly 26 as illustrated. The second terminal 72, the collector, is coupled to contactable terminal 62 of relay 50. Transistor 64 includes a threshold bias resistor 74 for raising the switching threshold of transistor 64.

A second transistor 76 has its base 78 coupled through resistor 80 to the energizing terminal 54. This terminal is also coupleable, as shown, to the ignition key in switch 16 and through diode 82 to the ignition circuit 18. A first terminal 84, the collector, of transistor 76 is coupleable to the audible warning alarm 30. A second terminal 86, the emitter, is coupleable to the driver's door pillar switch 24 and through diode 88 to the passenger door pillar switch 22.

In operation, circuit 10 does not inhibit the horn switch 32 from functioning normally by providing a grounding path for sounding the horn. As long as the key in and door open conditions are not simultaneously met, the door lock actuators function normally to lock and unlock the locking mechanisms. However, when the ignition key sensing switch 16 senses the presence of the key in the ignition and when one of the door sensing means senses an open door condition, circuit 10 switches to the interlock mode. Specifically, closure of ignition key in switch 16 applies battery voltage to energizing terminal 54 of relay 50. Closure of either of the door pillar switches 22 or 24 (by opening either of the doors) provides a grounding path for energizing terminal 56 of relay 50. These conditions cause current to flow through relay coil 52, switching the relay to the opposite position from that shown in FIG. 1. This action grounds the second terminal 72 of transistor 64. Now each time the door lock actuators 44 and 46 are actuated to the lock position, battery voltage is applied through resistor 68 to the base 66 of transistor 64. This turns transistor 64 on, pulling the first terminal 70 toward ground and thereby providing a grounding path for the horn assembly through transistor 64. In this regard, resistor 74 acts in conjunction with resistor 68 to provide a voltage divider for raising the switching threshold of transistor 64. Although transistor 64 is coupled to the relay coil 36 of horn 34, it is protected from induced back EMF by flyback diode 40. Thus, the circuit takes advantage of components already found onboard the vehicle in order to save cost, parts count and space. If the horn relay is not provided with flyback diode, then circuit 10 may need to be modified to include this diode in order to protect transistor 64 from induced EMF transients.

Because some vehicles are provided with ignition key in switches which open when the ignition key is turned to the ignition position (and thus cease providing an indication of ignition key presence in the ignition position) circuit 10 is also coupled to sense the ignition circuit as an alternate means of determining whether the key is in the ignition. Ignition circuit 18 is coupled through diode 82 to the energizing terminal 54 of relay 50. Thus, relay 50 is also capable of receiving current from the ignition circuit. Typically ignition circuits are constructed to deliver battery voltage in the "ignition on" position and to appear at vehicle ground in the "ignition off" position. To prevent terminal 54 from being grounded when the ignition key is turned to the ignition off position, diode 82 is provided. In effect, diode 82 conditions the signal from the ignition circuit so that it appears of the same form as the signal from the ignition key in switch, namely providing battery voltage when switched on and open circuit when switched off.

In order to operate the audible warning alarm 30, transistor 76 senses the state at terminal 54 of relay 50, which gives an indication of whether the ignition key is present or not. When the key is present, transistor 76 is turned on and provides a grounding path for operating the audible warning alarm when the driver's door pillar switch 24 is closed. Note that the diode 88 prevents the passenger door pillar switch 22 from providing a similar grounding path for the audible warning alarm 30.

Referring now to FIG. 2, an alternative embodiment of the invention is illustrated. Where applicable, reference numerals of like or similar components to that of FIG. 1 are given like reference numerals or reference numerals followed by the suffix "a" or "b", etc. By comparison with FIG. 1, note that horn relay 34a does not include a flyback diode. Accordingly, one is provided in the circuit 10a of the invention and will be discussed more fully below. Also by comparison, the door sensing switch 24a provides battery voltage when closed (by opening the vehicle door). This voltage is normally used to energize the courtesy lamp 90. The key in switch 16a provides a grounding path when the key is present in the ignition. This switch is coupled in parallel to the headlamp switch 92, so that either the failure to remove the ignition key or leaving the headlights on will provide a logic control signal to cause audible warning alarm 30 to sound when the vehicle door is opened. Also, note that the door lock mechanisms 48 are actuated by actuators comprising separate lock and unlock solenoids or relays 94 and 96 operated by a two position switch 98. It will be understood that relays 94 and 96 together with switch 98 comprise the door lock actuator 44a. For convenience, only two door lock motors and one actuator has been illustrated. Additional motors and additional actuators could be implemented in a similar fashion.

Turning now to circuit 10a of the invention, a first transistor 100 has its base 102 coupleable through resistor 104 to the door switch 24a. A first lead 106, the collector, of transistor 100 is coupled through blocking diode 108 and resistor 110 to the door lock actuator 44a, as illustrated. A second lead 112, the emitter, of transistor 100 is coupleable to the key in switch 16a, to headlamp switch 92 and to audible warning alarm 30, as illustrated. A second transistor 114 has its base 116 coupled through diode 118 and resistor 110 to the power door lock actuator 44a as illustrated. The first lead 120, the collector, of transistor 114 is coupleable through diode 122 to door lock actuator 44a. Lead 120 is also coupleable to the ground side lead 124 of relay 94 as illustrated. The second lead 126 of transistor 114, the emitter, is coupleable to vehicle ground.

A third transistor 128 has its base 130 coupleable through resistor 132 to the ground side lead 124 of relay 94 as illustrated. The first lead 134, the collector, of transistor 128 is coupleable to the horn relay 34a, while the second lead 136, the emitter, of transistor 128 is coupleable to vehicle ground. A zener protection diode 138 is connected across leads 134 and 136 to protect the transistor 128 from back EMF transients induced by the horn relay coil 36.

In operation, the circuit of FIG. 2 allows the horn to operate normally and further allows the power door lock mechanism to operate normally unless the circuit is in the interlock mode. During normal noninterlock mode operation, depressing the switch 98 to the locked position causes the battery voltage to be applied to relay 94. Transistor 114 senses this voltage and is turned on in response. With transistor 114 turned on, a grounding path is established from relay 94 through transistor 114 to the vehicle ground. This allows the relay to operate normally, energizing the door lock mechanism 48 in the usual fashion.

In the event the vehicle door is opened, door switch 24a closes, applying battery voltage to the base of transistor 100. If the key is in the ignition or if the headlamps are on at this time, the actuation of switch 98 allows transistor 100 to turn on and to pull the collector of transistor 100 toward ground. This action similarly pulls the emitter of transistor 114 toward ground, turning transistor 114 off. With transistor 114 turned off, the grounding path of relay 94 through transistor 114 is broken. This disables the locking mechanism from being actuated. With the path through transistor 114 broken, each time the door lock switch 98 is actuated, a current from relay 94 flows through resistor 132 to energize base 130 of transistor 128. This turns transistor 128 on, thereby establishing a grounding path through transistor 128 for sounding the horn.

During the operation described above, diode 108 blocks current flow to prevent the audible warning alarm 30 from sounding when the doors are closed. Diode 118 balances the voltage drop developed by diode 108, so that the voltage at base 116 of transistor 114 can be pulled to ground in order to turn off transistor 114.

The circuit of FIG. 2 relies solely on the key in switch to provide an indication that the key is in the ignition. This is appropriate for vehicles in which the key in switch remains on or closed when the ignition key is turned to the ignition on position. If necessary, the circuit can be modified to sense the ignition circuit as well. Also, in the power door lock circuit exemplified by FIG. 2, the solenoids or relays 94 and 96 are located on the vehicle itself. Accordingly, the invention advantageously uses these relays, thereby lowering the parts count and keeping cost to a minimum.

FIGS. 3, 4 and 5 illustrate additional alternative embodiments for use with power door lock circuits which do not provide onboard power door lock relays. The schematic diagrams of FIGS. 3, 4 and 5 illustrate in detail only the circuits 10b, 10c and 10d of the invention, with the associated vehicle components shown in block diagram. It will be understood that the circuits of FIGS. 3, 4 and 5 may be connected to the vehicle power door lock actuator and mechanism, ignition key sensing means, door sensing means, horn, battery and ground.

Referring first to FIG. 3, a one relay embodiment of a power door lock interlock circuit is illustrated at 10b. Circuit 10b is illustrated connected to lock switch 98a which provides a negative voltage on lead 140 when the lock is switched to the unlock position and which provides a positive voltage on lead 140 when switched to the lock position. Also illustrated are power door lock mechanisms 48.

Circuit 10b of FIG. 3 comprises a relay 142 comprising relay coil 144 and contacts 146. A transistor 148 has its base 150 coupleable through resistor 152 to the courtesy lamp switch 24a, which may be configured essentially as shown in FIG. 2. A first lead 154, the collector, of transistor 148 is connected to the coil of relay 142. A second lead 156, the emitter, is connected through diode 158 to the key in switch 16a, which may be configured essentially as the key in switch 16a of FIG. 2.

In operation, when the courtesy lamp circuit is energized (i.e. a door is open) and when the key in switch senses the ignition key in the ignition, transistor 148 is in a condition to switch on when lock switch 98a outputs a positive voltage on lead 140. This allows current to flow through coil 144 of relay 142, switching the contacts 146 to the opposite position from that shown in FIG. 3. Operation of the relay disconnects the power lock mechanism 48 and connects the horn circuit to the positive voltage source. Circuit 10b of FIG. 3 thus provides a positive voltage to the horn, causing it to sound. In this regard, it will be understood that the horn circuit is configured differently from that of FIG. 2, in that the circuit 10b provides current for actuating the horn, as opposed to providing a grounding path for completing the horn circuit. When either the courtesy lamp or the key in switch or both are not closed, transistor 148 is turned off and relay 142 is not energized. In this state, the power door lock functions normally.

Referring now to FIG. 4, a variation on the circuit of FIG. 3 is illustrated. In the circuit of FIG. 4, an additional relay 160 is provided for driving the horn circuit. In this circuit, the relay provides a grounding path for the horn. Accordingly, the circuit of FIG. 4 is compatible with the horn circuit of FIG. 2 in which the horn is sounded by providing a grounding path. The circuit of FIG. 4 also has the advantage of operating horns which demand higher current than can be switched through the power door lock actuator switch as in the circuit of FIG. 3.

Another embodiment is illustrated in FIG. 5. This embodiment employs a relay 162 whose coil 164 is coupleable to the courtesy lamp and key in switch directly. One of the relay terminals is coupleable to the horn through diode 166. The common terminal 168 is connectable to lead 140 of lock switch 98a while the other contactable terminal is connectable to the power door lock mechanism 48 via lead 170 as shown. A second diode 172 is connected between the door lock mechanism 48 and lead 140. In operation, when lock switch 98a is switched to the unlock position, a negative voltage is applied at lead 140 and current flows through diode 172 and through the door lock mechanism. When the courtesy lamp and key in switches are closed, energizing relay 162, the horn circuit is coupled through diode 166 to lead 140. When this occurs, any attempt to move the lock switch 98a to its lock position places a positive voltage on lead 140, causing current to flow through diode 166 to sound the horn. Diode 172 blocks the positive current flow, thereby preventing the door lock mechanism from operating. Preferably, diodes 166 and 172 should have high amperage ratings to correspond to the current requirements of the door lock mechanism and horn.

FIG. 6 illustrates another embodiment of the invention which in addition to providing an interlock circuit as described above also incorporates another helpful feature to prevent one from locking the keys in the car. The circuit of FIG. 6 monitors the manually operable door lock actuators. When the interlock condition exists (key in the ignition and door open), depressing any one of the manual door lock actuators causes all manual door lock actuators to spring to the unlocked position.

With reference to FIG. 6, the circuit includes passenger door pillar switch 22 and driver door pillar switch 24. As illustrated, switches 22 and 24 may be double pole or ganged switches, with one of the poles of each switch operating a courtesy light 90. In addition, the circuit is coupleable to the ignition key in switch 16b and to the ignition switch 18b. Transistor 174 drives audible warning alarm 30. Transistor 176 drives the horn 42. Transistors 178 and 180 operate generally as described above to inhibit the lock relay 94b from operating and by sounding the horn 42 when the interlock condition exists and the power door lock switch 98 is moved to the lock position.

In addition to the above circuitry, which is also explained in connection with the other embodiments, the circuit of FIG. 6 includes one and typically a plurality of manual door lock sensing switches 182. These switches are normally open when the manual door lock buttons are in the unlocked position and which close when the associated door lock button is moved to the locked position. In FIG. 6 two such switches 182 are shown. Switches 182 are connected in series with the pillar switches 22 and 24, as illustrated. The switches are connected to the emitter 186 of transistor 184. The base 188 of transistor 184 is coupled to node 190, so as to sense when the ignition key is in the ignition or when the ignition circuit is on. The collector 192 of transistor 184 is connected to the delay circuit 194. The delay circuit includes transistor 196 which is in turn coupled to transistor 198.

When the interlock condition is met (key in the ignition and door open), the pressing of a manual door lock button closes one of the switches 182. This causes transistor 184 to turn on, which in turn activates transistor 196. Transistor 196 in turn activates transistor 198 which energizes the unlock relay 96b. Energizing the unlock relay causes all of the manual door lock buttons to be urged to the unlock position. Delay circuit 194 causes transistor 196 to be turned on for nominally 0.5 seconds, or long enough for the locking mechanism 48 to unlock the doors in response to the unlock relay 96b.

In order to protect the locking mechanism 48 from burnout, delay circuit 194 times out in approximately 5 seconds whereupon transistor 196 is switched off. Thus if during the interlock conditions the operator presses one of the manual door lock buttons for longer than 5 seconds, the automatic unlocking circuit is overridden and the door stays locked.

The circuit of FIG. 6 also includes an optional horn control circuit 200 which, if included, causes the horn to sound each time the manual door lock button is depressed during the interlock condition. This horn control circuit may not be needed in all applications, since the door locking mechanism 48 typically provides an audible clunk which is adequate to alert the operator that the attempt to depress the door lock button was ineffective due to the interlock condition.

By way of the foregoing examples, it will be understood that the invention provides an economical power door lock interlock circuit which minimizes the number of electrical components required. These circuits are thus well suited for mass production automotive applications. The circuits can be mounted on printed circuit board or assembled using surface mount technology. Although a wide variety of different transistors and diodes may be used, the presently preferred embodiments employ NPN transistors. The current carrying capacity of the transistors are matched to the intended loads. Accordingly, transistor 64 of circuit 10 (FIG. 1) may be an MPS-651 transistor which supports a collector current on the order of two amperes. Transistor 76 may be a lower power transistor such as an MPS-A06, which supports a collector current of 0.5 amperes. The transistors in the other embodiments may be similarly selected. The diodes of all circuits except for that of FIG. 5 (which should have a high power rating), may be commercially available diodes such as 1N4002, which can support a 1 ampere current flow. The single pole double throw relay may have a 12 volt coil with 12 volt, 30 ampere contacts. Preferably the relays are suitable for printed circuit board mounting such as Bosch #0-332-206-106 or AMF #T90N5D12-12. Of course other suitable components may be used in place of these specified. Also, it will be understood that while NPN transistors have been utilized, it is possible to implement the invention using PNP transistors with some modification to the circuit polarities.

While the invention has been illustrated and described in connection with the presently preferred embodiments, it will be understood that the invention is capable of certain modification and change without departing from the spirit of the invention as set forth in the appended claims.

What is claimed is:

1. A power door lock interlock circuit for use in a vehicle having a power door lock actuator with mechanism responsive to said actuator, a horn, an ignition key sensing means for providing an indication when the ignition key is in the ignition and at least one vehicle door sensing means for providing an indication of the open and closed status of said door, comprising:

a single pole double throw relay having a pair of energizing terminals coupled to a coil and having a common terminal and first and second selectively contactable terminals, when said coil is deenergized said first contactable terminal being electrically coupled to said common terminal and when said coil is energized said second contactable terminal being electrically coupled to said common terminal;

said common terminal being coupleable to the vehicle ground;

said first contactable terminal being coupleable to said power door lock mechanism for supplying a grounding path for current flow in said mechanism;

one of said energizing terminals of said relay being coupleable to said key sensing means for receiving electrical current therefrom;

the other of said energizing terminals of said relay being coupleable to said door sensing means for providing a grounding path for current flow through said relay coil when said vehicle door is open;

a first transistor having its base coupleable to said door lock actuator and having a first lead coupleable to said horn for providing a grounding path for sounding said horn, and having a second lead coupled to said second contactable terminal of said relay;

whereby the presence of the key in the ignition and a vehicle door being open places said circuit in an interlock condition in which actuation of said power door lock actuator causes said horn to sound and in which said lock mechanism is simultaneously inhibited from being actuated.

2. The circuit of claim 1 wherein said vehicle includes an ignition circuit and wherein said one energizing terminal is also coupled to said ignition circuit for receiving current therefrom, whereby the reception of current from said ignition circuit and a vehicle door being open places said circuit in said interlock condition.

3. The circuit of claim 2 further comprising diode means coupled in series between said ignition circuit and said one energizing terminal of said relay for conducting current from said ignition circuit to said relay.

4. The circuit of claim 3 wherein said diode decouples said relay from said ignition circuit when said ignition circuit is grounded.

5. The circuit of claim 1 wherein said door sensing means comprises a driver door sensing means and a passenger door sensing means and wherein both said driver door sensing means and said passenger door sensing means are coupleable to said other energizing terminal.

6. The circuit of claim 5 further comprising diode means coupled in series between said driver doors sensing means and said other energizing terminal of said relay for providing a grounding from said relay coil through said driver door sensing means.

7. The circuit of claim 1 further comprising resistor means coupled between said base and said second lead of said first transistor for raising the switching threshold of said first transistor.

8. The circuit of claim 1 wherein said horn includes horn relay circuit which includes a flyback diode and wherein said first lead of said first transistor is coupled to said flyback diode for protecting said first transistor from transients produced by said horn relay.

9. The circuit of claim 1 wherein said vehicle includes an audible warning means and wherein said circuit further comprises a second transistor having its base coupled to said key sensing means and having a first lead coupleable to said audible warning means and a second lead coupleable to said door sensing means for providing a grounding path for current flow through said audible warning means when said vehicle door is open and said ignition key present in the ignition.

10. The circuit of claim 9 wherein said base of said second transistor is coupled to said key sensing means by a resistor.

11. The circuit of claim 9 wherein said vehicle includes an ignition circuit and wherein said base of said second transistor is also coupled to said ignition circuit for providing a grounding path for current flow through said audible warning means when said vehicle door is open and said ignition circuit is energized.

12. A power door lock interlock circuit for use in a vehicle having a power door lock actuator with mechanism responsive to said actuator, a horn, an ignition key sensing means for providing an indication when the ignition key is in the ignition and at least one door sensing means for providing an indication of the open and closed status of said door, comprising:

a first transistor having its base coupleable to said door sensing means for turning said first transistor on when said vehicle door is open;

said first transistor having a first lead coupleable to said lock actuator to receive current therefrom and having a second lead coupleable to said key sensing means for providing a ground path for current from said lock actuator through said key sensing means when said first transistor is on;

a second transistor having its base coupleable to said lock actuator to receive current therefrom for turning said second transistor on when said lock actuator is actuated;

said second transistor having a first lead coupleable to said lock mechanism and having a second lead coupleable to vehicle ground for providing a grounding path for said lock mechanism to permit said mechanism to function when said second transistor is on and to prevent said mechanism from functioning when said second transistor is off;

a third transistor having its base coupleable to said lock mechanism to receive a current therefrom for turning said third transistor on when a current is received from said lock mechanism and when said second transistor is off;

said third transistor having a first lead coupleable to said horn and having a second lead coupleable to said vehicle ground for providing a grounding path for sounding said horn when said third transistor is on;

whereby the presence of the key in the ignition and a vehicle door being open places said circuit in an interlock condition in which actuation of said power door lock actuator causes said horn to sound and in which said lock mechanism is simultaneously inhibited from being actuated.

13. The circuit of claim 12 wherein said vehicle includes a headlamp sensing switch and wherein said second lead of said first transistor is coupleable to said headlamp sensing switch to provide a grounding path when said first transistor is on;

whereby the on state of said headlamp and a vehicle door being open places said circuit in said interlock condition.

14. The circuit of claim 12 wherein said vehicle includes an audible warning means and wherein said second lead of said first transistor is coupleable to said warning means to provide logic current to said warning means when said first transistor is on.

15. The circuit of claim 12 further comprising first diode means coupled between said first lead of said first transistor and said actuator for conducting current from said actuator and for blocking current in the reverse direction.

16. The circuit of claim 15 further comprising second diode means coupled to said first diode means and to said base of said second transistor, said second diode means being polled opposite to that of said first diode means for balancing the diode drop of said first diode means.

17. The circuit of claim 12 further comprising second diode means coupled between said base of said second transistor and said actuator for conducting current from said actuator to said base of said second transistor.

18. The circuit of claim 12 further comprising diode means coupled across the first and second leads of said third transistor.

19. The circuit of claim 18 wherein said diode means is a zener diode.

20. The circuit of claim 12 further comprising diode means for coupling said first lead of said second transistor to said actuator.

21. A power door lock interlock circuit for use in a vehicle having a power door lock actuator with mechanism responsive to said actuator, a horn, an ignition key sensing means for providing an indication when the ignition key is in the ignition and at least one door sensing means for providing an indication of the open and closed status of said door, comprising:

a first transistor having a first lead coupleable to said ignition key sensing means and having a base coupleable to said door sensing means and having a second lead;

a single pole double throw relay having a pair of energizing terminals coupled to a coil and having a common terminal and first and second selectively contactable terminals, when said coil is deenergized said first contactable terminal being electrically coupled to said common terminal and when said coil is energized said second contactable terminal being electrically coupled to said common terminal;

one of said energizing terminals being coupled to said second lead of said first transistor and the other of said energizing terminals being coupleable to said door lock actuator said common terminal being coupleable to the vehicle ground;

said first contactable terminal being coupleable to said power door lock mechanism for supplying a grounding path for current flow in said mechanism;

said second contactable terminal being coupled with means for energizing said horn;

whereby the presence of the key in the ignition and a vehicle door being open places said circuit in an interlock condition in which actuation of said power lock actuator causes said horn to sound and in which said lock mechanism is simultaneously inhibited from being actuated.

22. A power door lock interlock circuit for use in a vehicle having a power door lock actuator with mechanism responsive to said actuator, a horn, an ignition key sensing means for providing an indication when the ignition key is in the ignition and at least one door sensing means for providing an indication of the open and closes status of said door, comprising:

a single pole double throw relay having a pair of energizing terminals coupled to a coil and having a common terminal and first and second selectively contactable terminal, when said coil is deenergized said first contactable terminal being electrically coupled to said common terminal and when said coil is energized said second contactable terminal being electrically coupled to said common terminal;

said common terminal being coupleable to said power door lock actuator;

one of said energizing terminals being coupleable to said ignition key sensing means and the other of said energizing terminals being coupleable to said door sensing means;

said first contactable terminal being coupleable to said power door lock mechanism;

a first diode coupled to said second contactable terminal and to said horn; and a second diode coupled between said power door lock actuator and said door lock mechanism;

whereby the presence of the key in the ignition and a vehicle door being open places said circuit in an interlock condition in which actuation of said power door lock actuator causes said horn to sound by being energized through said first diode and in which said lock mechanism is simultaneously inhibited from being actuated.

* * * * *

UNITED STATES PATENT AND TRADEMARK OFFICE
CERTIFICATE OF CORRECTION

PATENT NO. : 4,789,851

DATED : December 6, 1988

INVENTOR(S) : Darryl A. Hock, et al.

It is certified that error appears in the above-identified patent and that said Letters Patent is hereby corrected as shown below:

Column 12, line 35, Claim 22, "closes" should be -- closed --.

Signed and Sealed this

Twelfth Day of December, 1989

Attest:

JEFFREY M. SAMUELS

*Attesting Officer*         *Acting Commissioner of Patents and Trademarks*